United States Patent [19]
Kono

[11] Patent Number: 5,732,284
[45] Date of Patent: Mar. 24, 1998

[54] DIRECT MEMORY ACCESS (DMA) CONTROLLER UTILIZING A DELAYED COLUMN ADDRESS STROBE (CAS) SIGNAL

[75] Inventor: Shinichi Kono, Tokyo, Japan

[73] Assignee: NEC Corporation, Tokyo, Japan

[21] Appl. No.: 626,010

[22] Filed: Apr. 1, 1996

[30] Foreign Application Priority Data

Mar. 31, 1995 [JP] Japan ................................ 7-075598

[51] Int. Cl.[6] ............................................... G06F 13/12
[52] U.S. Cl. ........................................ 395/845; 364/242.31
[58] Field of Search ......................... 395/842, 845, 395/846, 853

[56] References Cited

U.S. PATENT DOCUMENTS

| | | | |
|---|---|---|---|
| 4,706,221 | 11/1987 | Satoh et al. | 365/222 |
| 5,175,864 | 12/1992 | Tairaku et al. | 395/800 |
| 5,404,335 | 4/1995 | Tobita | 365/222 |
| 5,530,901 | 6/1996 | Nitta | 395/848 |
| 5,561,816 | 10/1996 | Mitsuhira et al. | 395/842 |

FOREIGN PATENT DOCUMENTS

| | | |
|---|---|---|
| 0 704 849 | 4/1996 | European Pat. Off. |
| 43 09 363 | 10/1993 | Germany |
| 61-162886 | 7/1986 | Japan |
| 63-271561 | 11/1988 | Japan |
| 3-204753 | 9/1991 | Japan |
| 3-223948 | 10/1991 | Japan |
| 4-199450 | 7/1992 | Japan |

OTHER PUBLICATIONS

Patent Abstracts of Japan, vol. 95, No. 10, JP-A-07 281992, Oct. (1995).
"Digital RAS/CAS Generation for Dynamic Memories", IBM Technical Bulletin, vol. 31, No. 12, May (1989), pp. 28–30.
"Dynamic Random Access Memory Refresh Method in Triple–Modular–Redundant System", IBM Technical Bulletin, vol. 36, No. 7, Jul. (1993), pp. 7–12.

Primary Examiner—Lance Leonard Barry
Attorney, Agent, or Firm—Foley & Lardner

[57] ABSTRACT

Address generators output addresses of transfer data of transfer origin and destination DRAM's. Updating of the transfer addresses from the address generators during execution of DMA is performed based on a CAS signal from a timing signal generator. A delay element delays the CAS signal by a time which is the sum of an access time of the transfer origin DRAM and a data set-up time of the transfer destination DRAM. A transfer data counter counts the number of leading edges of the CAS signal while a RAS signal from the timing signal generator is held active. When a counted value reaches a preset value, the transfer data counter outputs continuous data transfer suspension information to the timing signal generator. With this arrangement, the halt in operation of a CPU due to continuous occupation of a bus is effectively prevented while achieving the increased data transfer rate.

6 Claims, 8 Drawing Sheets

DIRECT MEMORY ACCESS (DMA) CONTROLLER UTILIZING A DELAYED COLUMN ADDRESS STROBE (CAS) SIGNAL

BACKGROUND OF THE INVENTION

1. Field of the Invention

The present invention relates to a DMA (direct memory access) controller, and more specifically, to a DMA controller which performs data transfer between a plurality of dynamic random access memories (DRAM's) at high rate by means of the hardware without involving a microprocessor.

2. Description of the Related Art

In recent years, a DMA controller (DMAC) which achieves DMA transfer, that is, data transfer between a plurality of DRAM's or between a DRAM and input-output ports via the hardware without involving a microprocessor, has been required to have further higher DMA transfer rates. For this purpose, as described in, for example, Japanese Unexamined Patent Publications No. 4-199450 and No. 3-223948, such a DMAC has been proposed that achieves the continuous access using the page mode or the static column mode of the DRAM.

FIG. 1 is a structural diagram showing the conventional DMAC as described in the foregoing publication No. 4-199450. As shown in the figure, the DMAC includes a first storing means 2, a reading means 3, a second storing means 5 and a writing means 6 which are connected to a central processing unit (CPU) bus 1, and further includes a register file 4 connected between the reading means 3 and the writing means 6.

In this conventional DMAC, in response to a data transfer request from the CPU or the like, the CPU releases the CPU bus 1. Then, the reading means 3 reads N (positive integer) words from among data stored in the first storing means 2 to be transferred and stores them in the register file 4. The writing means 6 stores one-page data stored in the register file 4 into the second storing means 5.

Specifically, according to this conventional DMAC, assuming that the first and second storing means 2 and 5 are DRAM's, the page mode or the static column mode of the DRAM's is used so that one-page data are continuously read out from the first storing means 2 by fixing the row address and changing the column address and written in the register file 4, and thereafter, the written one-page data are written in the second storing means 5 continuously by fixing the row address and changing the column address. Thus, the one-page data can be transferred with the single designation of the row address so that the DMA transfer can be accelerated.

FIG. 2 is a structural diagram showing another conventional DMAC as described in Japanese Unexamined Patent Publication No. 3-204753, wherein the data transfer is achieved during one cycle. In the figure, when performing the data transfer from a memory 13 to a memory 15, an address signal indicative of a transfer origin is outputted from a DMA controller (DMAC) 11 to the memory 13 via an address bus 12, and an address signal indicative of a transfer destination is outputted from the DMAC 11 to the memory 15 via an address bus 14.

When a read signal fed to the memory 13 from the DMAC 11 via a signal line 16 becomes active, data stored in the memory 13 are read out onto a data bus 17, and simultaneously, a write signal fed to the memory 15 from the DMAC 11 via a signal line 18 becomes active. Thus, the data read out onto the data bus 17 are written in the memory 15. In this fashion, the data transfer from the memory 13 to the memory 15 is completed during one cycle.

As described above, the conventional DMA controller shown in FIG. 1 aims at the speed-up of data transfer based on the continuous access, while the conventional DMA controller shown in FIG. 2 aims at the speed-up of data transfer based on the one-cycle data transfer achieved by the simultaneous execution of the reading and the writing. However, the speed-up of data transfer is still insufficient in either of these DMA controllers.

In view of this, the present inventors have proposed a DMA controller as shown in FIG. 3 and as described in Japanese Patent Application No. 6-99222, which realizes both the continuous data transfer and the one-cycle data transfer. As shown in FIG. 3, the DMA controller (DMAC) 20 includes two DRAM control sections 21 and 22, a transfer direction controller 23, a timing signal generator 24, a delay circuit 25, a switching circuit 26 and an inverter 27.

According to the DMAC 20, the DRAM control section 21 produces an address signal for a DRAM 31 which is a transfer origin and continuously accessible, and outputs it to the DRAM 31. On the other hand, the DRAM control section 22 produces an address signal for a DRAM 32 which is a transfer destination and continuously accessible, and outputs it to the DRAM 32. The timing signal generator 24 produces a row address strobe (RAS) signal and a column address strobe (CAS) signal based on output control signals fed from the DRAM control sections 21 and 22. As shown in FIG. 3, the RAS signal is directly fed to both DRAM's 31 and 32.

Further, while the row address is held unchanged as checked by the DRAM's 21 and 22, that is, as long as the continuous transfer is possible, the CAS signal from the timing signal generator 24 is fed to the transfer origin DRAM 31 via the switching circuit 26 for reading out stored data from the DRAM 31, while the CAS signal delayed by a given time by means of the delay circuit 25 is fed to the transfer destination DRAM 32 in a switched fashion for writing the read-out data in the DRAM 32, based on an output signal from the transfer direction controller 23. By repeating this, the data reading and the data writing are achieved in one cycle. Thus, according to the DMAC 20, the high-speed and efficient data transfer can be realized.

However, the DMAC 20 proposed by the present inventors has such problem that although the speed-up of the data transfer and the enhancement in efficiency of the data transfer are effectively achieved, since the DMAC 20 continues to occupy a bus 50 as long as the condition for the continuous transfer is satisfied, an operation of a CPU 30 is stopped while the bus 50 is occupied.

SUMMARY OF THE INVENTION

The present invention has been made in view of the foregoing and has an object to provide a DMA controller which simultaneously achieves the continuous access and the simultaneous execution of reading and writing so as to further increase the data transfer rate while preventing an operation of a CPU from stopping due to continuous occupation of a bus.

In order to accomplish the foregoing object, a DMA controller according to the present invention comprises a first memory control section for producing, by a first address generator, a first address signal for a first memory which is a transfer origin and continuously accessible, and for outputting the first address signal to the first memory; a second memory control section for producing, by a second address generator, a second address signal for a second memory which is a transfer destination and continuously accessible, and for outputting the second address signal to the second memory; a timing signal generator for producing first and second address strobe signals based on output control signals from the first and second memory control sections, the timing signal generator outputting the first address strobe signal to the first and second memories, respectively, and the second address strobe signal to the first memory; delay means for delaying the second address strobe signal by a time which is a sum of an access time of the first memory and a data set-up time of the second memory, and for outputting the delayed second address strobe signal to the second memory; first and second control means, provided in the first and second memory control sections, respectively, for outputting control signals separately to the timing signal generator so as to control generation of the first and second address strobe signals for achieving continuous access of the first and second memories independently of each other; and a transfer data counter for counting the number of transfer data from the second address strobe signal of the timing signal generator and for outputting transfer suspension information to the timing signal generator when a counted value reaches a preset value.

It may be arranged that the DMA controller further comprises transfer direction control means for subjecting the first memory to a reading control and the second memory to a writing control, and switching means, based on an output signal from the transfer direction control means, for feeding the second address strobe signal from the timing signal generator to the first memory and for feeding the delayed second address strobe signal from the delay means to the second memory. With this arrangement, a direction of the data transfer between the two memories can be switched depending on an instruction from a senior device.

It may be arranged that at least one of the first and second memories is a dynamic random access memory which is operable in a page mode or a static column mode, and that each of the first and second control means includes latch means for holding a row address in address signals outputted from corresponding one of the first and second address generators upon transition of the first address strobe signal to an active state at the time of starting the data transfer, and a comparator for comparing an output of the latch means and a row address in the address signals outputted from the corresponding one of the first and second address generators and for outputting a result of the comparison as the control signal to the timing signal generator, wherein, while the comparison result shows agreement, the timing signal generator controls the second address strobe signal to change alternately between active and inactive states while holding the first address strobe signal to be active. This arrangement is preferable in view of achieving the continuous access.

According to one aspect of the present invention, by repeating the writing of data, which are outputted by the first memory in synchronism with the second address strobe signal from the timing signal generator, into the second memory in synchronism with the delayed second address strobe signal, the first and second memories can be continuously accessed, and simultaneously, the data reading from the first memory and the data writing into the second memory can be achieved in one cycle.

According to another aspect of the present invention, the number of transfer data is counted by the transfer data counter, and when this counted value reaches the preset value, the first address strobe signal is forcibly set inactive based on the transfer suspension information. Thus, the number of continuous transfer data in the DMA transfer is limited to the foregoing preset value.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings.

Figure 1:
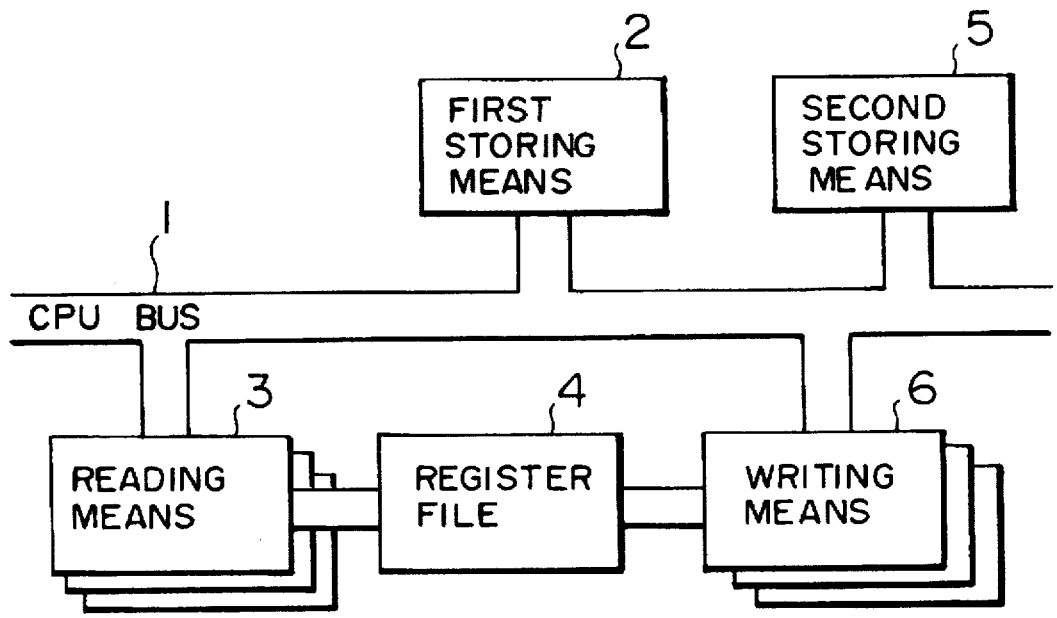
FIG. 1 is a block diagram showing a structure of a conventional DMA controller.
Figure 2:
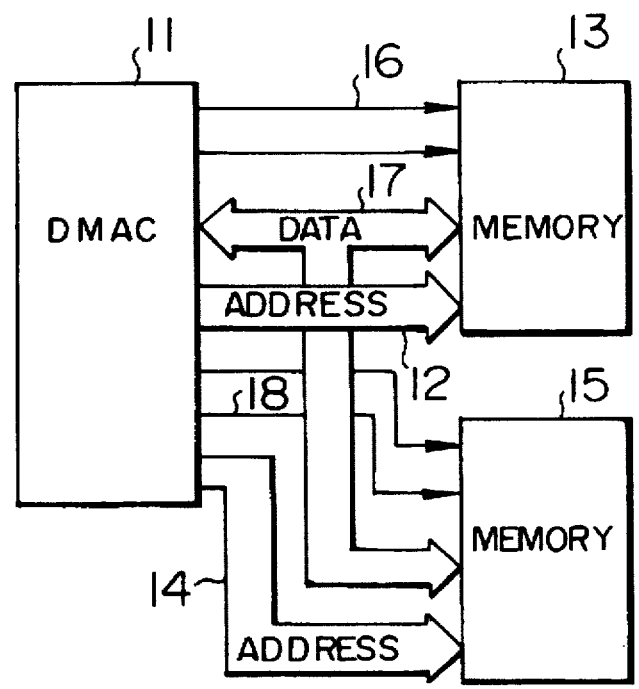
FIG. 2 is a block diagram showing a structure of another conventional DMA controller.
Figure 3:
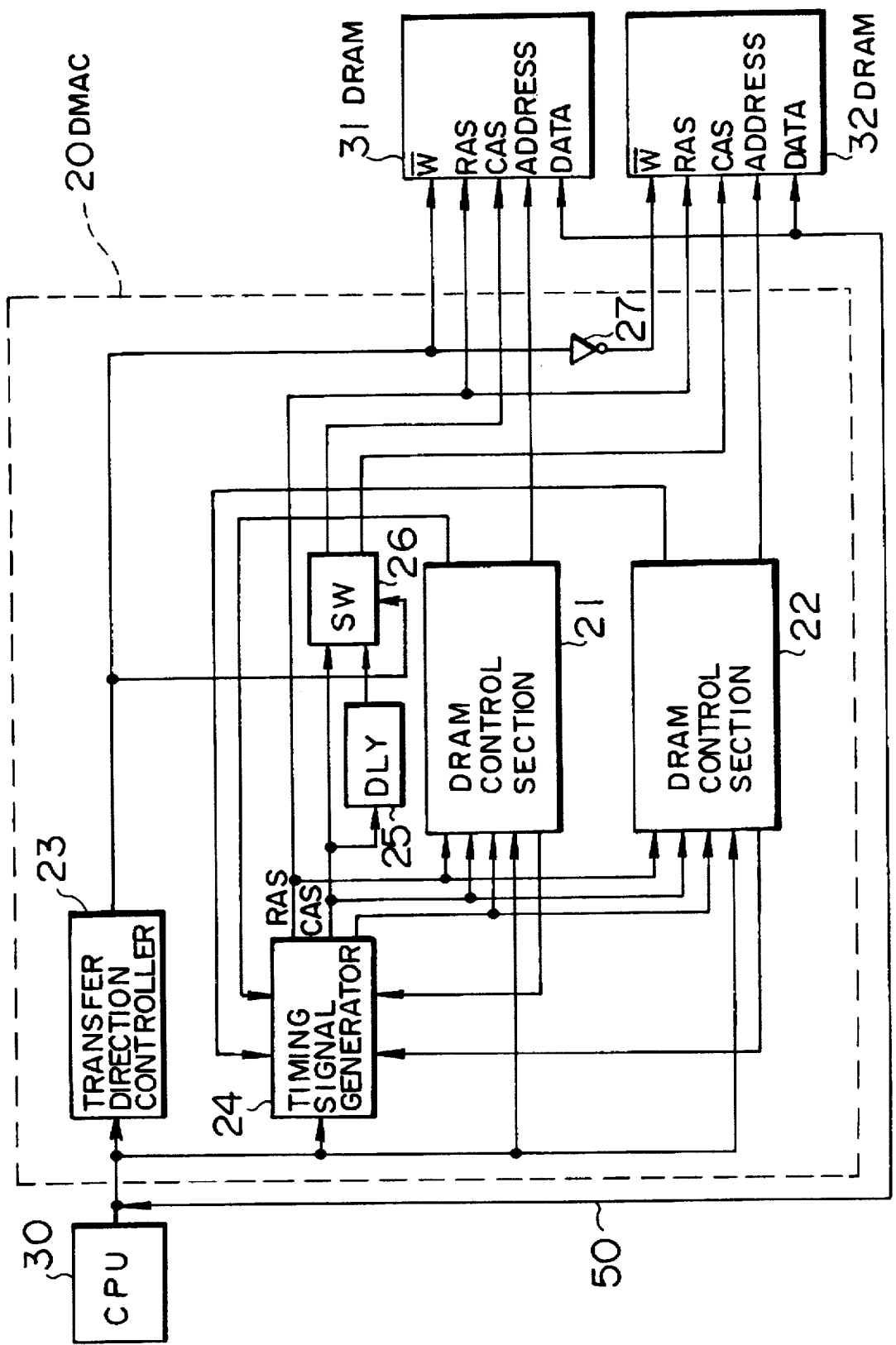
FIG. 3 is a block diagram showing a structure of a DMA controller previously proposed by the present inventors.
Figure 4:
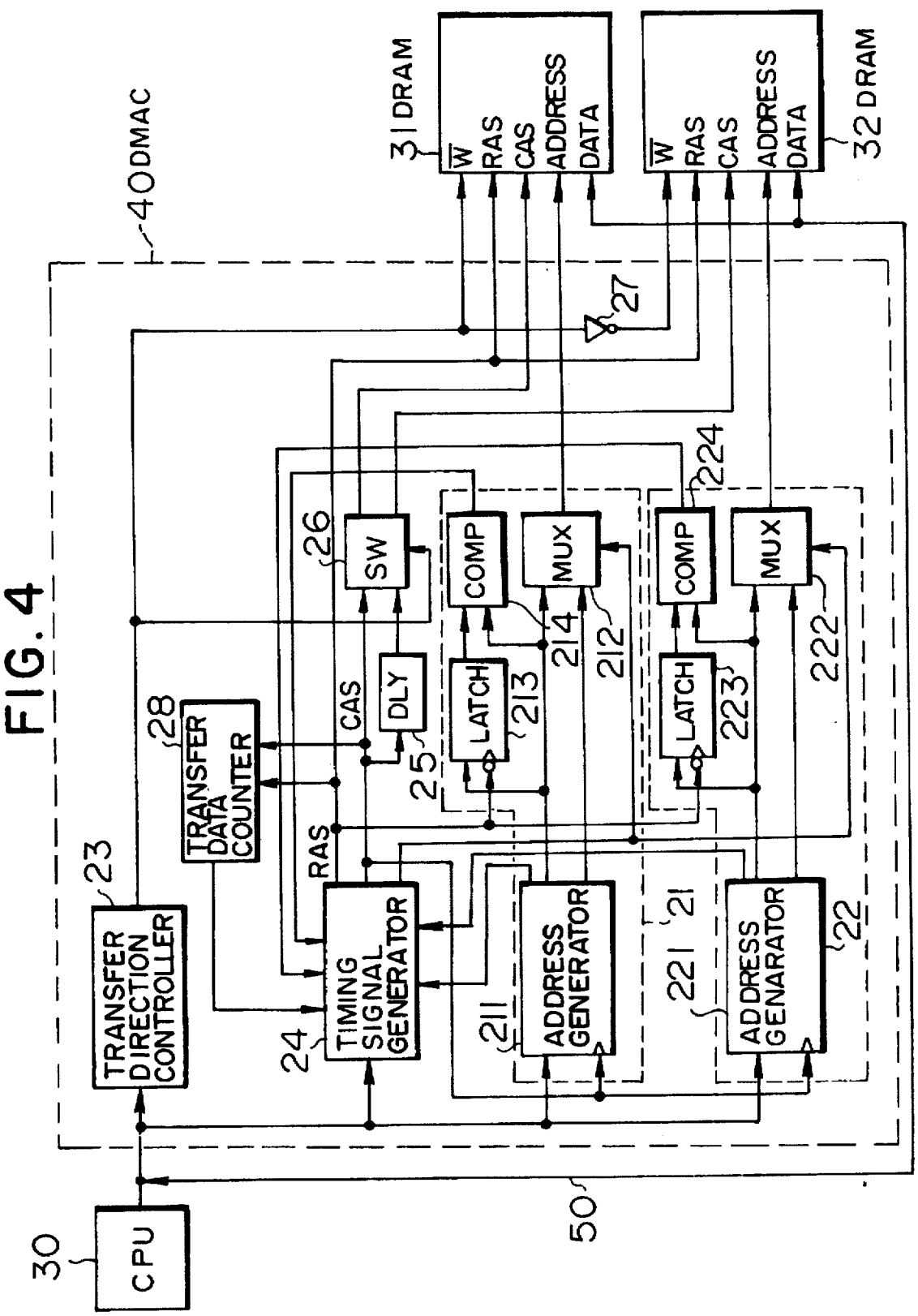
FIG. 4 is a block diagram showing a structure of a DMA controller according to a preferred embodiment of the present invention.

FIG. 4 is a block diagram showing a DMA controller according to the preferred embodiment of the present invention. In the figure, the DMA controller (DMAC) 40 includes a first DRAM control section 21, a second DRAM control section 22, a transfer direction controller 23, a timing signal generator 24, a delay circuit 25, a switching circuit 26, an inverter 27 and a transfer data counter 28. The DMAC 40 is initialized by a central processing unit (CPU) 30 and performs the data transfer control between a DRAM 31 and a DRAM 32 using one of the DRAM's 31 and 32 as a data transfer origin and the other of them as a data destination. Data terminals of the DRAM's 31 and 32 are connected to the CPU 30 via a bus 50.

The first DRAM control section 21 includes an address generator 211, a multiplexer (MUX) 212, a latch circuit 213, and a comparator 214. The second DRAM control section 22 includes an address generator 221, a multiplexer (MUX) 222, a latch circuit 223, and a comparator 224. The first DRAM control section 21 is connected to an address terminal of the DRAM 31, while the second DRAM control section 22 is connected to an address terminal of the DRAM 32.

The address generators 211 and 221 output addresses of transfer data of the transfer origin and destination DRAM's. A head address and an end address of the transfer data or the number of transfer data is initialized by the CPU 30. Updating of the transfer addresses from the address generators 211 and 221 during execution of the DMA is performed based on a CAS (column address strobe) signal fed from the timing signal generator 24. Further, the address generators 11 and 221 output the row addresses and the column addresses separately and feed to the timing signal generator 24 information as to whether the transfer ends or not.

The MUX's 212 and 222 synthesize the row addresses and the column addresses fed from the address generators 211 and 221, respectively. The latch circuits 213 and 223 latch the row addresses fed from the address generators 211 and 221, respectively, at the timing of trailing edge of a RAS (row address strobe) signal outputted from the timing signal generator 24. The comparators 214 and 224 compare the row addresses fed from the address generators 211 and 221 and the row addresses outputted from the latch circuits 213 and 223, respectively, and feed results of the comparison to the timing signal generator 24 as information whether the compared row addresses coincide with each other or not, respectively.

The transfer direction controller 23 is a circuit for controlling a direction of the data transfer between the DRAM's 31 and 32, and is set by the CPU 30. Based on outputs from the comparators 214 and 224 and outputs from the address generators 211 and 221, the timing signal generator 24 feeds a switch timing signal to the MUX's 212 and 222 for switching between the row addresses and the column addresses for the DRAM's 31 and 32, respectively. The timing signal generator 24 further feeds the RAS signal to the DRAM's 31 and 32 and the latch circuits 213 and 223 and further feeds the CAS signal to the DRAM's 31 and 32, the address generators 211 and 221 and others.

The delay circuit 25 delays the CAS signal from the timing signal generator 24 by a time which is the sum of an access time of the transfer origin DRAM in the DRAM's 31 and 32 and a data set-up time of the transfer destination DRAM in the DRAM's 31 and 32. The switching circuit 26 selects one of the CAS signals from the timing signal generator 24 and the delay circuit 25 based on a control signal from the transfer direction controller 23. Further, the inverter 27 inverts the control signal from the transfer direction controller 23 for inputting to a write control terminal of the DRAM 32.

The transfer data counter 28 counts the number of leading edges of the CAS signal from the timing signal generator 24, that is, the number of transfer data while the RAS signal from the timing signal generator 24 is held in an active state (low level), that is, during execution of the continuous data transfer based on the page mode. When a counted value reaches a preset value, the transfer data counter 28 outputs to the timing signal generator 24 information indicative of suspension of the continuous data transfer. In this preferred embodiment, the preset value of the transfer data counter 28 can be changed to a desired value from exterior.

Figure 6:
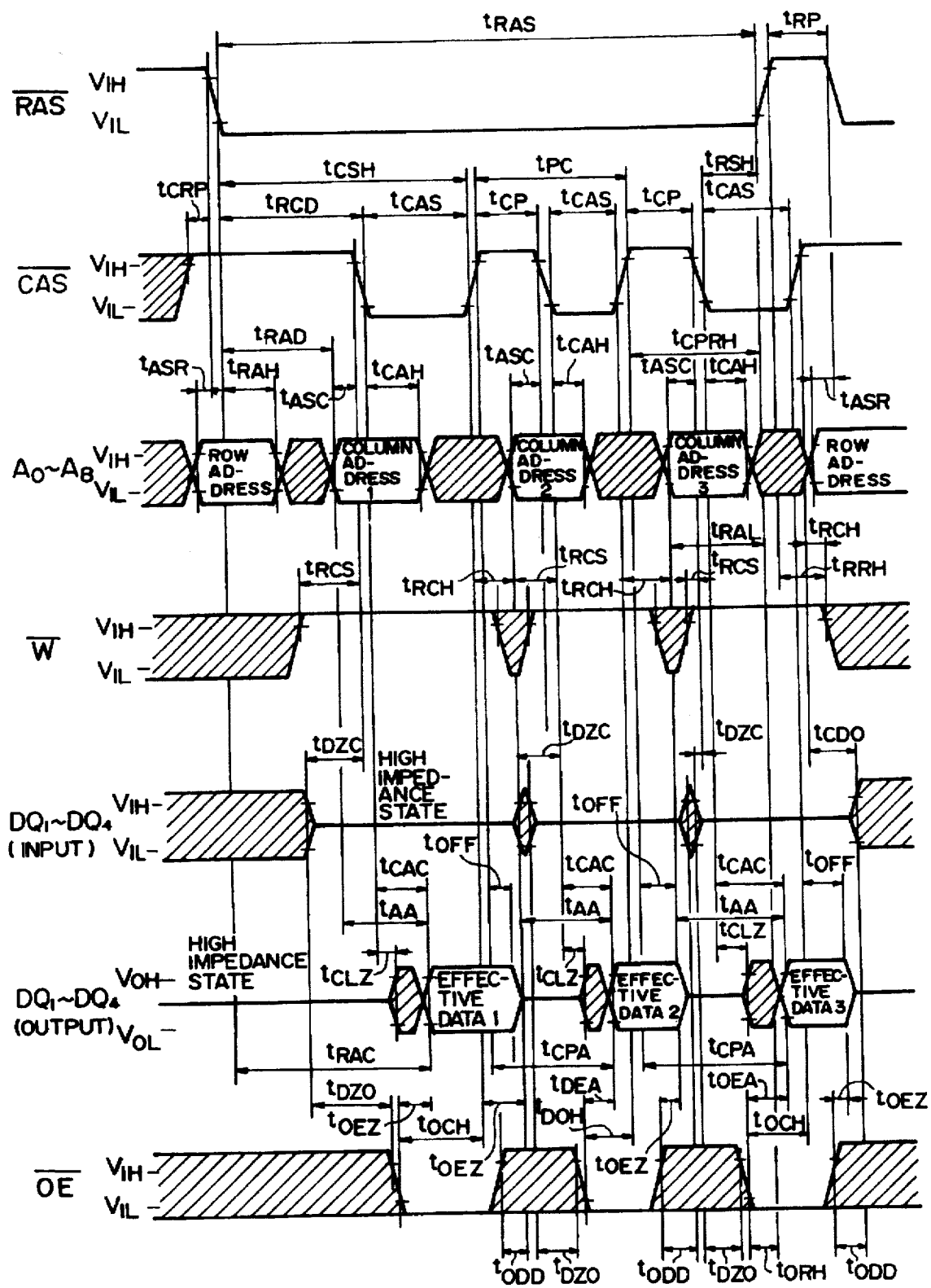
FIG. 6 is a timing chart for explaining an operation of a page mode read cycle.
Figure 7:
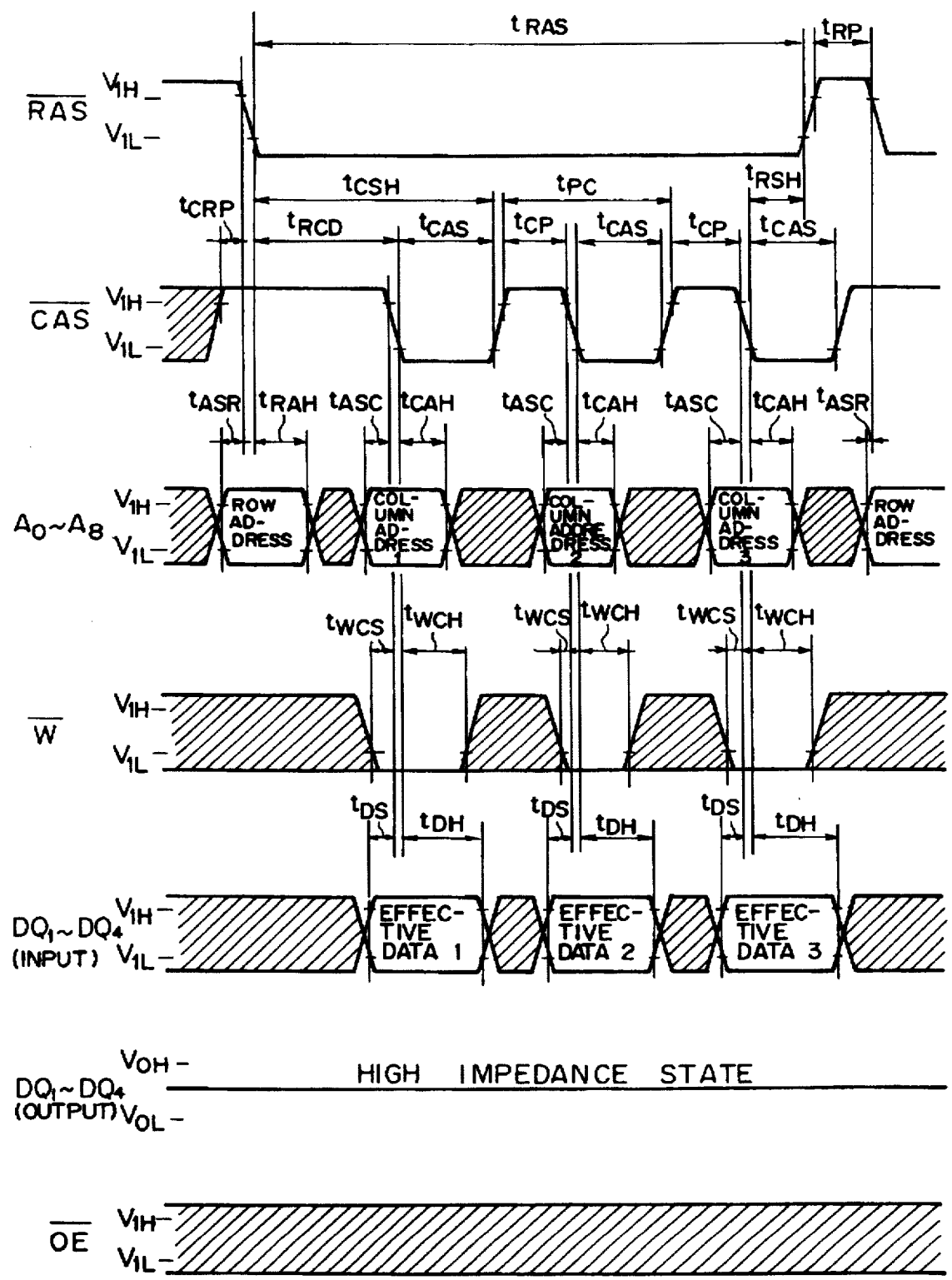
FIG. 7 is a timing chart for explaining an operation of a page mode write cycle.

In this preferred embodiment, it is assumed that the DRAM's 31 and 32 are memory circuits each supporting the page mode. As appreciated, the page mode itself is known in the art. FIG. 6 is a timing chart of a read cycle of the page mode, while FIG. 7 is a timing chart of a write cycle of the page mode. In FIGS. 6 and 7 and further in FIGS. 8 and 9 referred to later, the RAS signal is represented by RAS with bar, the CAS signal by CAS with bar, a write enable signal by W with bar, and a chip select signal by CS with bar. This is because those signals are in active states while being at low levels, respectively.

During the read cycle of the page mode, as shown in FIG. 6, while the RAS signal is held in an active state (low level), the CAS signal is once set to an inactive state (high level) so as to input a row address. Then, while the write enable signal W is held in an inactive state, the CAS signal is changed between the active and inactive states alternately so as to input column addresses in the same row in sequence for reading out corresponding stored data. In FIG. 6, OE with bar represents an output enable signal.

On the other hand, during the write cycle (early write) of the page mode, as shown in FIG. 7, while the RAS signal is held in an active state, the CAS signal is once set to an inactive state so as to input a row address. Then, before changing the CAS signal to be active again, the write enable signal W is set active (low level). Then, by changing the CAS signal between the active and inactive states alternately, column addresses in the same row are inputted in sequence so that input data DQ1 to DQ4 are written in sequence. At this time, the output enable signal OE may be set in either of active and inactive states.

Now, the operation of this preferred embodiment will be described also referring to FIG. 5. First, before starting the data transfer, the CPU 30 sets the direction of the data transfer between the DRAM's 31 and 32 in the transfer direction controller 23, and further sets a transfer start address and a transfer termination address or the number of transfer data in the address generators 211 and 221. When the data transfer is performed in a direction from the DRAM 31 to the DRAM 32, the CPU 30 controls the output control signal of the transfer direction controller 23 to be at a high level.

The control signal outputted from the transfer direction controller 23 is fed to a write control terminal of the DRAM 31. Since the DRAM 31 is set to be subjected to a read control when the control signal from the transfer direction controller 23 is at a high level, the DRAM 31 works as the transfer origin DRAM. On the other hand, since the control signal from the transfer direction controller 23 is inverted via the inverter 27 and then inputted to a write control terminal of the DRAM 32, the DRAM 32 is subjected to a write control as opposed to the DRAM 31 so that the DRAM 32 works as the transfer destination DRAM. As appreciated, the foregoing transfer direction is reversed when the control signal from the transfer direction controller 23 is at a low level.

Then, the CPU 30 instructs the timing signal generator 24 to start the data transfer. In response to the data transfer start instruction from the CPU 30, the timing signal generator 24 switches the MUX's 212 and 222 to output the row addresses. Subsequently, as shown at (A) in Fig. 5, the timing signal generator 24 causes the RAS signal to fall at a time t1 so that the latch circuits 213 and 223 latch the foregoing row addresses, respectively. Thereafter, the timing signal generator 24 switches the MUX's 212 and 222 to output the column addresses.

Then, the timing signal generator 24 causes the CAS signal to fall at a time t2. Since the CAS signal is inputted as it is via the switching circuit 26 to the transfer origin DRAM in the DRAM's 31 and 32, the data is outputted from the transfer origin DRAM due to the falling of the CAS signal. This CAS signal is shown at (B) in FIG. 5. As shown at (E) in FIG. 5, the effective data is outputted from a time t3, that is, after a lapse of an access time from the falling of the CAS signal at the time t2.

On the other hand, since the CAS signal delayed by the given time via the delay circuit 25 is inputted via the switching circuit 26 to the transfer destination DRAM in the DRAM's 31 and 32, the data outputted from the transfer origin DRAM is written in the transfer destination DRAM due to the falling of this delayed CAS signal. This delayed CAS signal is shown at (C) in FIG. 5. Due to the delay achieved by the delay circuit 25, the transfer destination DRAM writes in the effective data immediately after the time t3. The data inputted to the transfer destination DRAM is shown at (F) in FIG. 5.

Figure 5:
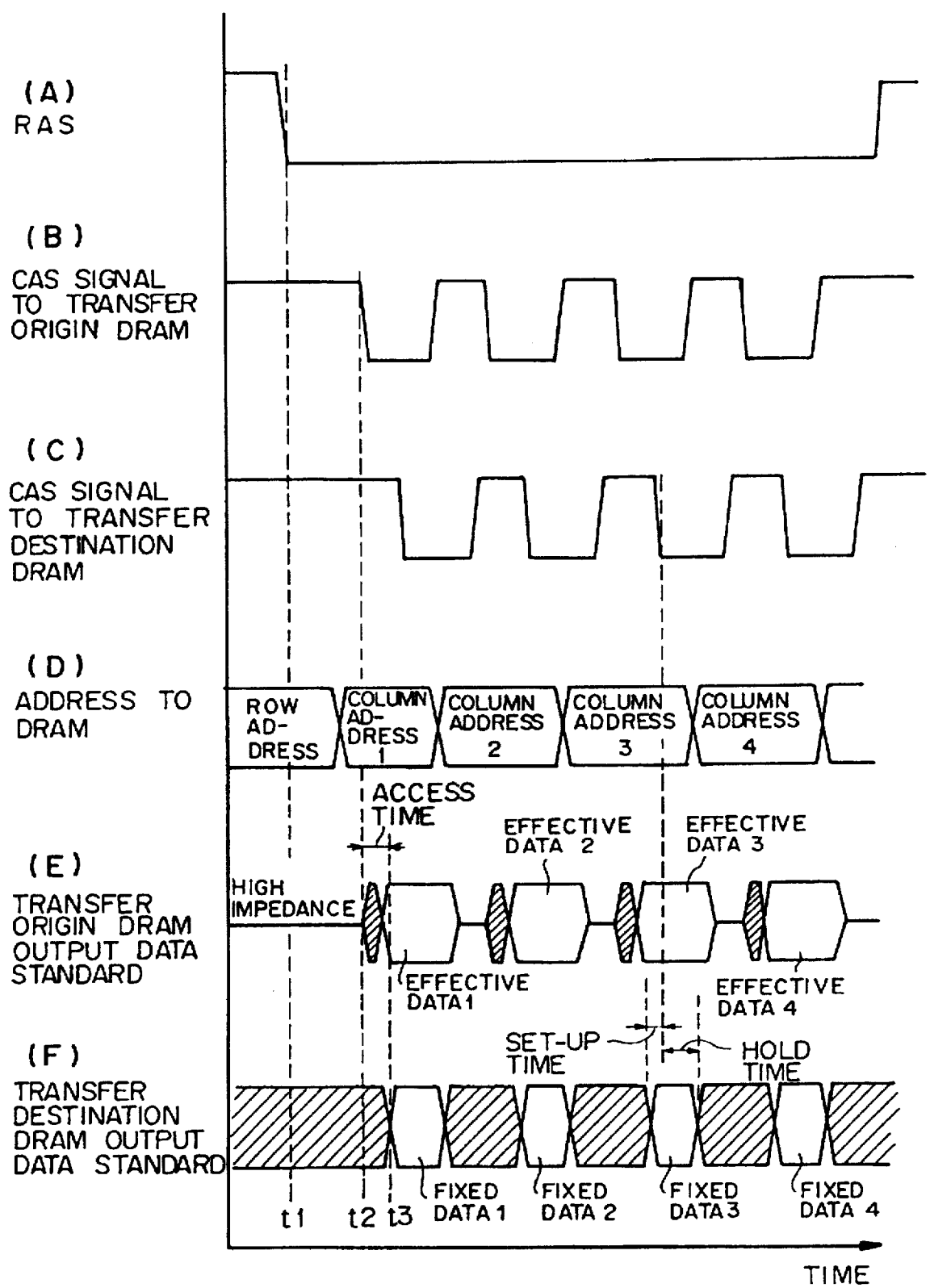
FIG. 5 is a timing chart for explaining an operation of the preferred embodiment of the present invention shown in FIG. 4.

After the delayed CAS signal to the transfer destination DRAM shown at (C) in FIG. 5 is caused to fall and then a sufficient time for writing the data in the transfer destination DRAM elapses, the timing signal generator 24 raises the CAS signal as shown at (B) in FIG. 5. At this time, if the transfer termination address or the number of transfer data set in the address generators 211 and 221 by the CPU 30 is reached, the timing signal generator 24 raises the RAS signal so as to terminate the continuous access between the DRAM's 31 and 32.

Further, when a counter value of the transfer data counter 28, which counts the number of leading edges of the CAS signal (the number of transfer data), reaches the preset value, the timing signal generator 24 also raises the RAS signal based on the transfer suspension data outputted from the transfer data counter 28 to the timing signal generator 24, so as to terminate the continuous access between the DRAM's 31 and 32.

On the other hand, if the transfer termination address or the number of transfer data set in the address generators 211 and 221 by the CPU 30 is not reached and if the counter value of the transfer data counter 28 does not reach the preset value, the address generators 211 and 221 update the addresses fed to the address terminals of the DRAM's 31 and 32 at the time of rising of the CAS signal.

After this address updating, if the comparators 214 and 224 output detection signals indicative of coincidence of the row addresses, respectively the timing signal generator 24 causes the CAS signal to fall so that the subsequent data transfer is achieved in the same manner as described above. FIG. 5 at (D) shows the addresses inputted to each of the DRAM's 31 and 32 via the MUX's 212 and 222.

As described above, the operation to perform the page mode access by repeatedly changing the CAS signal between the low level and the high level while the RAS signal is held at the low level, is repeated until the output of the comparator 214 or 224 indicates disagreement of the row addresses or the transfer termination address or the number of transfer data set in the address generator 211 or 221 is reached after the address updating of the address generators 211 and 221.

If the output of either the comparator 214 or the comparator 224 shows the disagreement or the counter value of the transfer data counter 28 reaches the preset number of transfer data, the timing signal generator 24 raises the RAS signal to suspend the continuous access to the DRAM's 31 and 32 and switches the MUX's 212 and 222 to output a row address in the same manner as that performed in response to the transfer start instruction from the CPU 30, so as to repeat the foregoing operation.

As described above, according to this preferred embodiment, since the continuous access based on the page mode of the DRAM's 31 and 32 and the execution of reading from the transfer origin DRAM and writing into the transfer destination DRAM in one cycle are simultaneously performed, the data transfer can be achieved at the much higher transfer rate as compared with the prior art due to the multiplied effect of the speed-up based on the continuous access and the speed-up based on the one-cycle execution of the reading and the writing between the two DRAM's.

Further, in this preferred embodiment, since the limitation is provided to the number of transfer data achieved in one continuous data transfer by providing the transfer data counter 28 to limit the operation of the timing signal generator 24, the delay in operation of the CPU 30 due to the long-term occupation of the bus 50 by the DMAC 40 is effectively prevented.

Figure 8:
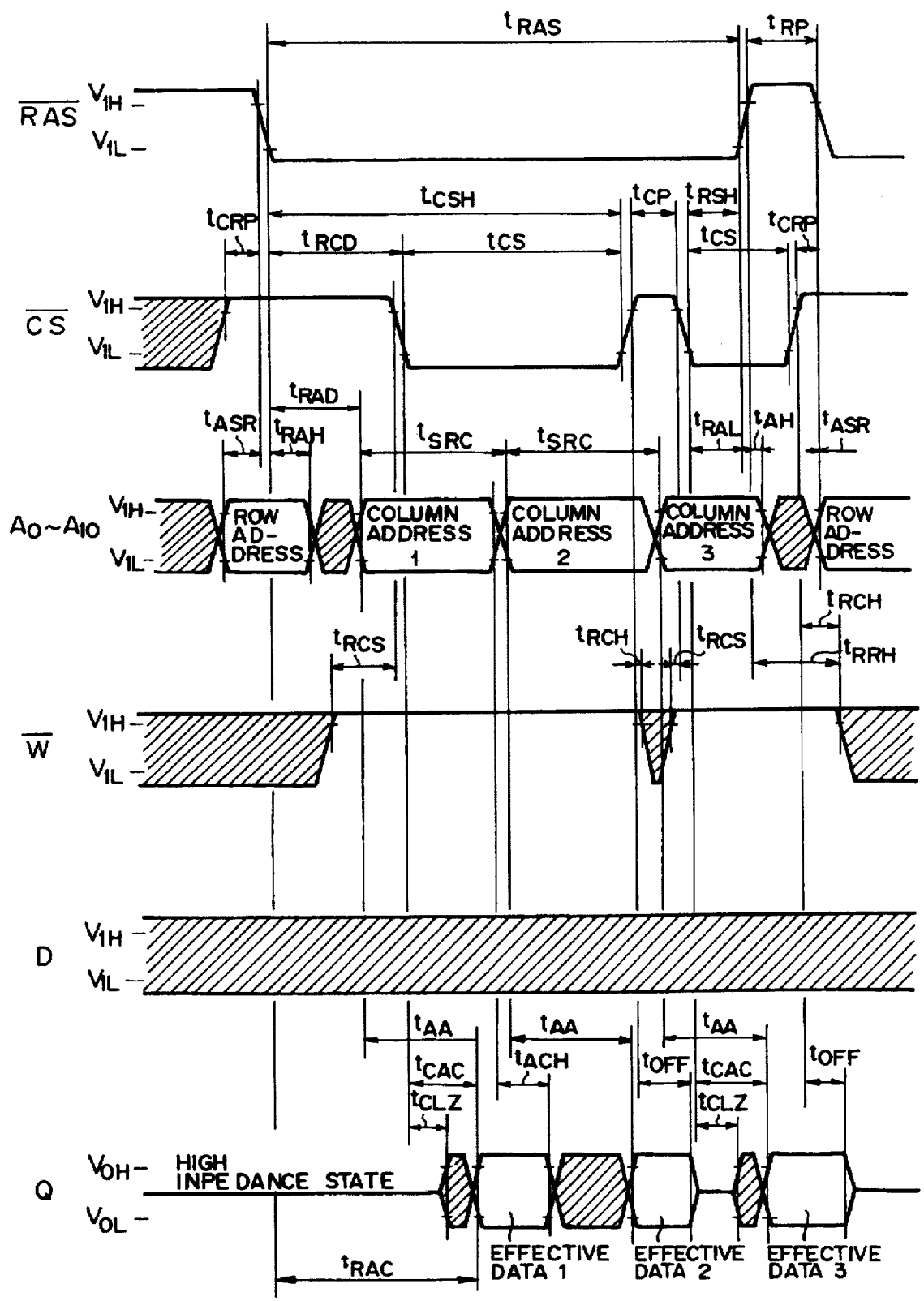
FIG. 8 is a timing chart for explaining an operation of a static column mode read cycle.

The present invention is not limited to the foregoing preferred embodiment. For example, it may be arranged that one of or both the DRAM's 31 and 32 are memory circuits supporting the static column mode. During a read cycle of the static column mode, as shown in FIG. 8, the chip select (CS) signal corresponding to the CAS signal is changed alternately between active and inactive states after setting a RAS signal to be active, so as to designate in sequence column addresses in the same row for the continuous access of them. Further, a write enable signal W is set inactive so that stored data are read out in sequence from an output terminal Q.

Figure 9:
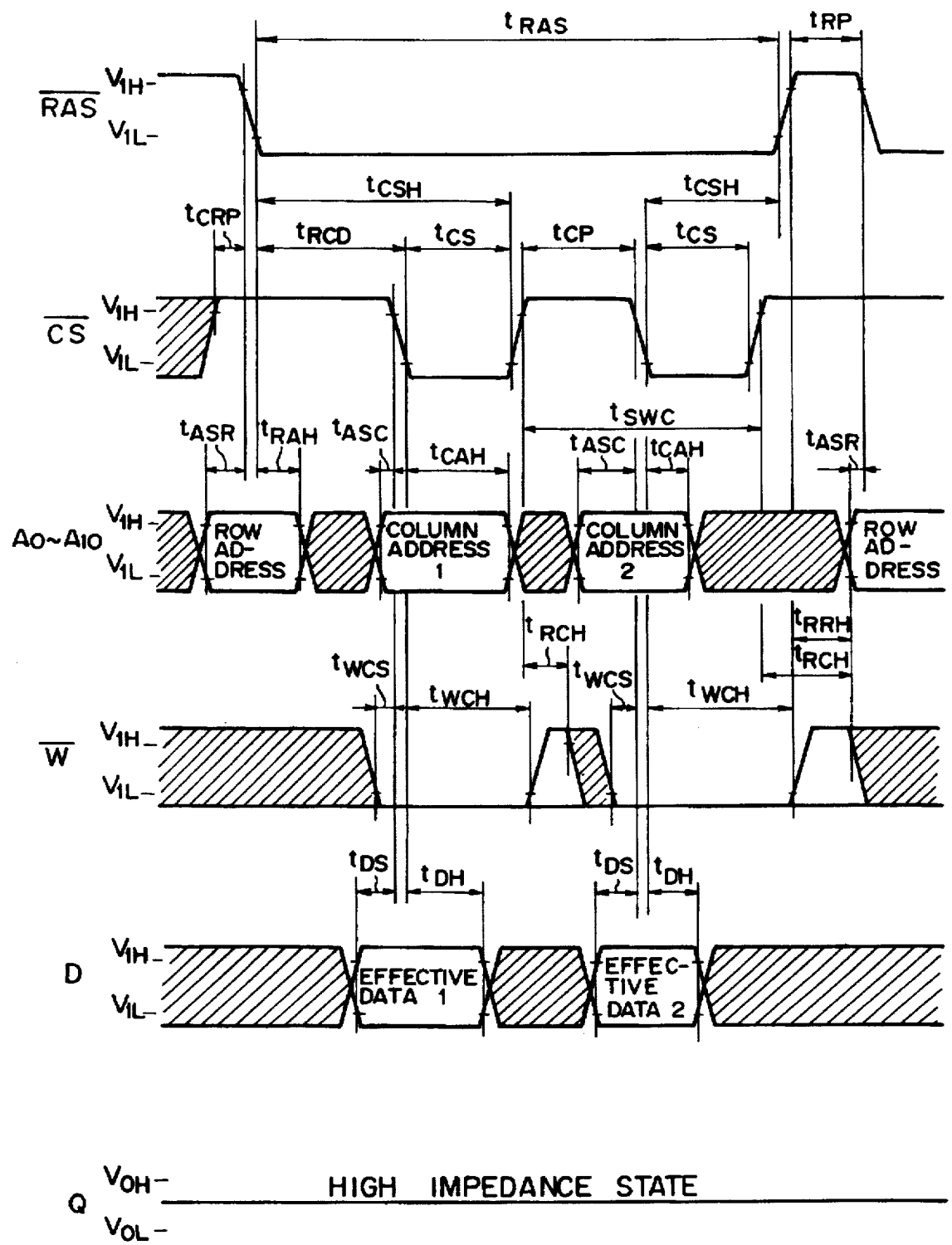
FIG. 9 is a timing chart for explaining an operation of a static column mode write cycle.

On the other hand, during a write cycle of the static column mode, as shown in FIG. 9, after the RAS signal is set active, the write enable signal W is set active before the CS signal is set active. Thereafter, the CS signal is changed alternately between the active and inactive states so as to designate in sequence the column addresses in the same row for the continuous access of them so that the input data are written in sequence. At this time, the output terminal Q of the DRAM is held at a high impedance state.

One of the DRAM's 31 and 32 may be a register or the like which is arranged for interfacing with the DRAM capable of achieving the page mode or the static column mode (in the present invention, such a register or the like is also defined as a memory). Further, the transfer direction controller 23 and the switching circuit 26 may be omitted when the data transfer is performed only in one direction between two memories.

As described above, according to the preferred embodiment of the present invention, the two memories are continuously accessed using the page mode or the static column mode, and simultaneously, the reading of data from one of the memories and the writing of data into the other of the memories are performed in one cycle. Thus, due to the multiplied effect of them, the DMA transfer between the two memories can be achieved at the much higher transfer rate as compared with the prior art.

Further, since the number of continuous transfer data in the DMA transfer is limited to the preset value by means of the transfer data counter, the halt in operation of the CPU due to the longsterm occupation of the bus during the continuous access is effectively prevented.

What is claimed is:

1. A DMA controller comprising:
   a first memory control section for producing, by a first address generator, a first address signal for a first memory which is a transfer origin and continuously accessible, and for outputting said first address signal to said first memory;
   a second memory control section for producing, by a second address generator, a second address signal for a second memory which is a transfer destination and continuously accessible, and for outputting said second address signal to said second memory;
   a timing signal generator for producing first and second address strobe signals based on output control signals from said first and second memory control sections, said timing signal generator outputting said first address strobe signal to said first and second memories, respectively, and said second address strobe signal to said first memory;
   delay means for delaying said second address strobe signal by a time which is a sum of an access time of said first memory and a data set-up time of said second memory, and for outputting the delayed second address strobe signal to said second memory;

first and second control means, provided in said first and second memory control sections, respectively, for outputting control signals separately to said timing signal generator so as to control generation of said first and second address strobe signals for achieving continuous access of said first and second memories independently of each other; and a transfer data counter for counting the number of transfer data from said second address strobe signal of said timing signal generator and for outputting transfer suspension information to said timing signal generator when a counted value reaches a preset value, wherein writing of data, which are outputted by said first memory in synchronism with said second address strobe signal from said timing signal generator, into said second memory in synchronism with said delayed second address strobe signal is repeated and wherein, when at least the number of repeating of said data writing into said second memory reaches said preset value, said first address strobe signal is forcibly set inactive based on said transfer suspension information.

2. The DMA controller according to claim 1, further comprising transfer direction control means for subjecting said first memory to a reading control and said second memory to a writing control, and switching means, based on an output signal from said transfer direction control means, for feeding said second address strobe signal from said timing signal generator to said first memory and for feeding said delayed second address strobe signal from said delay means to said second memory.

3. The DMA controller according to claim 1, each of said first and second control means includes latch means for holding a row address in address signals outputted from corresponding one of said first and second address generators upon transition of said first address strobe signal to an active state at the time of starting the data transfer, and a comparator for comparing an output of said latch means and a row address in the address signals outputted from the corresponding one of said first and second address generators and for outputting a result of the comparison as said control signal to said timing signal generator, wherein, while said comparison result shows agreement, said timing signal generator controls said second address strobe signal to change alternately between active and inactive states while holding said first address strobe signal to be active.

4. The DMA controller according to claim 1, wherein said transfer data counter counts the number of transitions from active to inactive of said second address strobe signal while said first address strobe signal is held active and compares its counted value with said preset value.

5. The DMA controller according to claim 1, wherein each of said first and second memories is a dynamic random access memory which is operable in a page mode, and wherein said first address strobe signal is a row address strobe signal and said second address strobe signal is a column address strobe signal.

6. The DMA controller according to claim 1, wherein at least one of said first and second memories is a dynamic random access memory which is operable in a static column mode, and wherein said first address strobe signal is a row address strobe signal and said second address strobe signal is a chip select signal.

* * * * *